United States Patent

Crawford et al.

[11] Patent Number: 4,475,769
[45] Date of Patent: Oct. 9, 1984

[54] HINGE AND LATCH ARRANGEMENT FOR VEHICLE SEATS

[75] Inventors: Ray V. Crawford, Warren; Regis V. Pilarski, Utica; Robert J. Rumpf, Grosse Pointe, all of Mich.

[73] Assignees: General Motors Corporation, Detroit, Mich.; The Firestone Tire & Rubber Company, Akron, Ohio

[21] Appl. No.: 401,187

[22] Filed: Jul. 23, 1982

[51] Int. Cl.³ ............................................. B60N 1/10
[52] U.S. Cl. .................................. 297/331; 297/366; 297/367; 297/379
[58] Field of Search ......... 297/379, 331, 378, 361–369

[56] References Cited

U.S. PATENT DOCUMENTS

| 3,727,976 | 4/1973 | Lystad | 297/379 |
| 3,900,225 | 8/1975 | Wirtz et al. | 297/367 |
| 4,147,386 | 4/1979 | Stolper | 297/362 |

FOREIGN PATENT DOCUMENTS

| 4484 | 10/1979 | European Pat. Off. | 297/331 |
| 41411 | 12/1981 | European Pat. Off. | 297/331 |
| 2708461 | 8/1978 | Fed. Rep. of Germany | 297/379 |

Primary Examiner—William E. Lyddane
Assistant Examiner—Mark W. Binder
Attorney, Agent, or Firm—Herbert Furman

[57] ABSTRACT

A tilting seat back is mounted on a vehicle by a first hinge member which is pivoted to a second vehicle mounted hinge member. The first hinge member includes a plurality of teeth and a pawl mounted on the second hinge member is engageable with each of the teeth. The first hinge member holds the pawl in the path of one tooth when the seat back is in the upright position for engagement of the tooth with the pawl upon inertia actuated movement of the seat back to a tilted position. The pawl is released and positioned adjacent the rotative path of the other teeth for inertia actuated movement into engagement with the other teeth when the seat back is in a partially tilted position.

6 Claims, 8 Drawing Figures

HINGE AND LATCH ARRANGEMENT FOR VEHICLE SEATS

This invention relates generally to a hinge and latch arrangement for vehicle seats and more particularly to such an arrangement which mounts a tilting seat back on a vehicle and holds the seat back in an upright position and in each of a plurality of partially tilted positions against movement to a fully tilted position under vehicle induced inertia forces.

BACKGROUND OF THE INVENTION

It is known to provide a vehicle seat with an inertia seat back latch arrangement for blocking forward tilting movement of a vehicle seat back under vehicle induced inertia forces. Reference may be had to Williams U.S. Pat. No. 2,732,003, Semar U.S. Pat. No. 2,737,229 and Leslie U.S. Pat. No. 2,873,794 for examples of such arrangements.

It is also known to provide an inertia seat back latch arrangement wherein the inertia latch member has a locking abutment gravity located in the path of a striker for inertia actuated engagement therewith but permitting relative movement between the latch member and the striker during normal movement of the seat back. Boschen U.S. Pat. No. 3,549,202 shows such an arrangement. It is also known to provide such an arrangement wherein the inertia actuated latch member is engageable with either of two shoulders of the striker under vehicle induced inertia forces. Arlauskas et al. U.S. Pat. No. 3,972,564 shows such an arrangement.

The arrangement of this invention is primarily intended for use with folding or displaceable rear seats of multipurpose vehicles. In such vehicles, the cargo to the rear of the seat may displace the tilting seat back of the seat from its upright position to one of a plurality of intermediate or partially tilted positions during normal usage of the vehicle. The invention provides a hinge and latch arrangement for mounting the seat back on the vehicle and holding the seat back against inertia actuated movement when the seat back is in its upright position and in each of a plurality of intermediate or partially tilted positions.

In a preferred embodiment, the arrangement includes a pair of pivotally interconnected hinge members, one being mounted on the vehicle and the other being mounted to the seat back to mount the seat back on the vehicle for movement: to an upright position; to a fully tilted generally horizontal position; and to a plurality of intermediate or partially tilted positions. An inertia actuated pawl is pivotally supported on the vehicle mounted hinge member for engagement with each of a plurality of teeth arranged radially about the pivot of the seat back hinge member and spaced circumferentially of each other. One tooth corresponds to the upright position of the seat back and the other teeth each correspond to a respective intermediate tilted position of the seat back.

When the seat back is in the upright position, the seat back hinge member engages a plastic coated abutment portion of the pawl to positively hold the pawl against movement and position the tooth of the pawl immediately adjacent to and directly in the path of one tooth of the seat back hinge member for instantaneous engagement therewith to block any movement of the seat back to a tilted position under vehicle induced inertia forces. When the seat back is in an intermediate tilted position, the seat back hinge member is disengaged from the pawl and the abutment portion of the pawl is gravity held against the vehicle mounted hinge member to locate the pawl tooth immediately adjacent to and out of the rotative path of movement of the other teeth of the seat back hinge member for movement into engagement with one of such other teeth under vehicle induced inertia forces.

Thus, in the arrangement of this invention, the pawl is positively held against inertia actuated movement and located in the path of one of a plurality of teeth when the seat back is in upright position to lock the seat back against inertia movement, and is gravity located for inertia actuated movement into the rotative path of others of the teeth when the seat back is in an intermediate tilted position to lock the seat back against further tilting movement. Thus, seat back inertia forces control the locking of the pawl when the seat back is in the upright position and pawl inertia forces control the locking of the pawl when the seat back is in an intermediate tilted position. The plastic coated abutment portion of the pawl and the seat back hinge member cooperatively provide a pawl anti-rattle feature when the seat back is in the upright position and the abutment portion and the vehicle mounted hinge member likewise provide the same feature when the seat back is in a partially tilted position.

In the interest of space economy, the vehicle mounted hinge member is of generally channel shape and the seat back hinge member is mounted between the side walls of the vehicle mounted hinge member. The teeth on the seat back hinge member are arranged radially and circumferentially about the pivot of the seat back hinge member and extend generally toward the base of the vehicle mounted hinge member. The pawl is also mounted between the side walls of the vehicle mounted hinge member and straddled by an edge of a cut out of the seat back hinge member. The seat back hinge member engages an integral rib of the plastic coated abutment portion of the pawl when the seat back is in the upright position, and such abutment portion gravity engages the base of the vehicle mounted hinge member when the seat back is in an intermediate tilted position. Further, a seat belt buckle support arm is coaxially mounted with the seat back hinge member and cooperating means between the support arm and the seat back hinge member moves the support arm and buckle to a stored position when the seat back is tilted and to an upright position when the seat back is in the upright position so that the buckle is always properly stored or located for use by a passenger in accordance with the position of the seat back.

The primary feature of this invention is that it provides a seat back hinge and latch arrangement having an inertia actuated rotatable pawl which is positively held against inertia actuated rotation and located for instantaneous engagement with a tilting seat back support member to block inertia movement of the seat back when the seat back is in a normal upright position and which is freed for inertia actuated rotation into engagement with such support member to block inertia movement of the seat back when the seat back is in one of a number of intermediate or partially tilted positions. Another feature is that the seat back support member includes a series of circumferentially spaced radially extending teeth arranged about the pivot axis of the support member on a vehicle mounted hinge member, with one of the teeth corresponding to the upright position of the seat back and being instantaneously engageable with the pawl upon inertia actuated movement of the seat back when the seat back is in the upright position, and the other teeth each respectively corresponding to one of the partially tilted positions of the seat back and being engageable by the pawl upon inertia actuated movement of the pawl when the seat back is in a corresponding partially tilted position. A further feature is that the seat back support member engages a plastic coated abutment portion of the pawl to noiselessly positively locate the pawl in the path of the one tooth when the seat back is in the upright position, and the abutment portion of the pawl engages the vehicle mounted hinge member under gravity bias to noiselessly locate the pawl adjacent the rotative path of the other teeth when the seat back is in one of the partially tilted positions. Yet another feature is that the vehicle mounted hinge member is of channel shape and the seat back support member and pawl are mounted between the walls of the vehicle mounted hinge member for space economy. Yet a further feature is that the vehicle mounted hinge member also supports a seat belt buckle support member coaxially with the seat back support member. Still another feature is that cooperating means between the seat back support member and the buckle support member locate the buckle in stored or in use position when the seat back is respectively in the tilted or upright position.

These and other features of the invention will be readily apparent from the following specification and drawings wherein.

Figure 1:
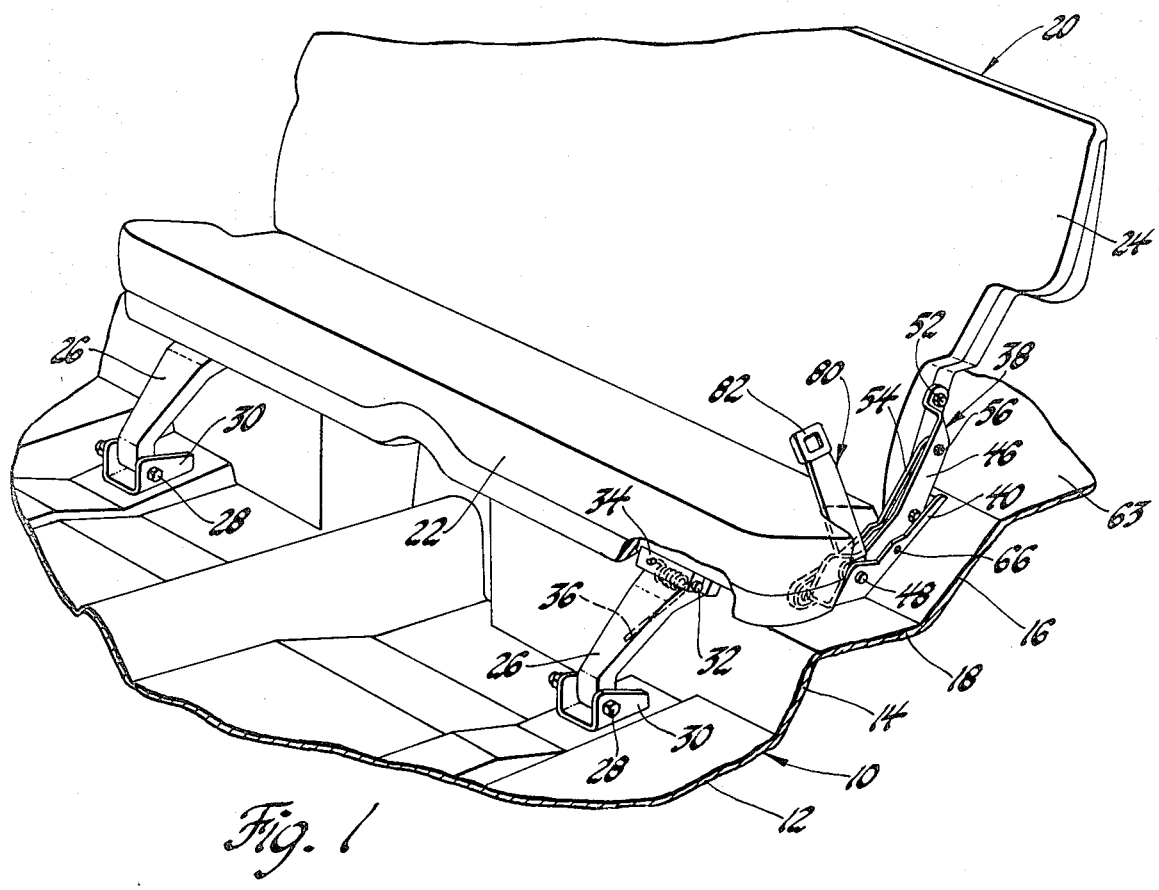
FIG. 1 is a partial front perspective view of a vehicle having a rear seat including a forwardly displaceable seat cushion and a tilting seat back mounted thereon by a hinge and latch arrangement according to this invention, with the seat cushion and seat back shown in normal position.
Figure 2:
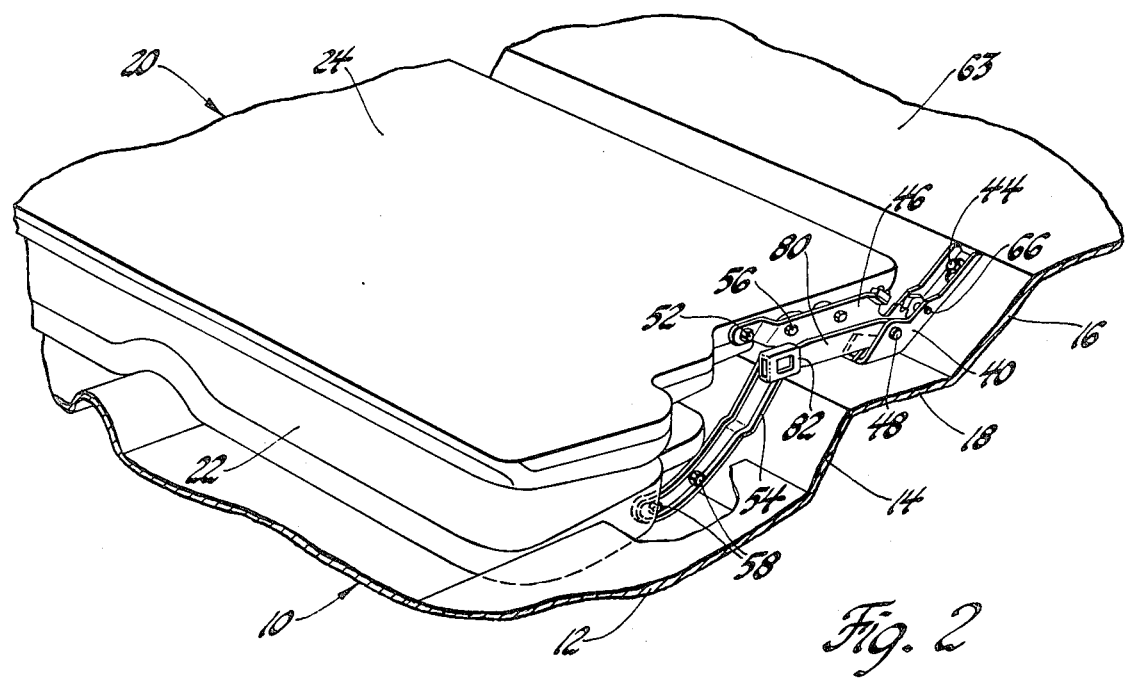
FIG. 2 is a partial view showing the seat cushion in its forwardly displaced position and the seat back in its fully tilted position.
Figure 3:
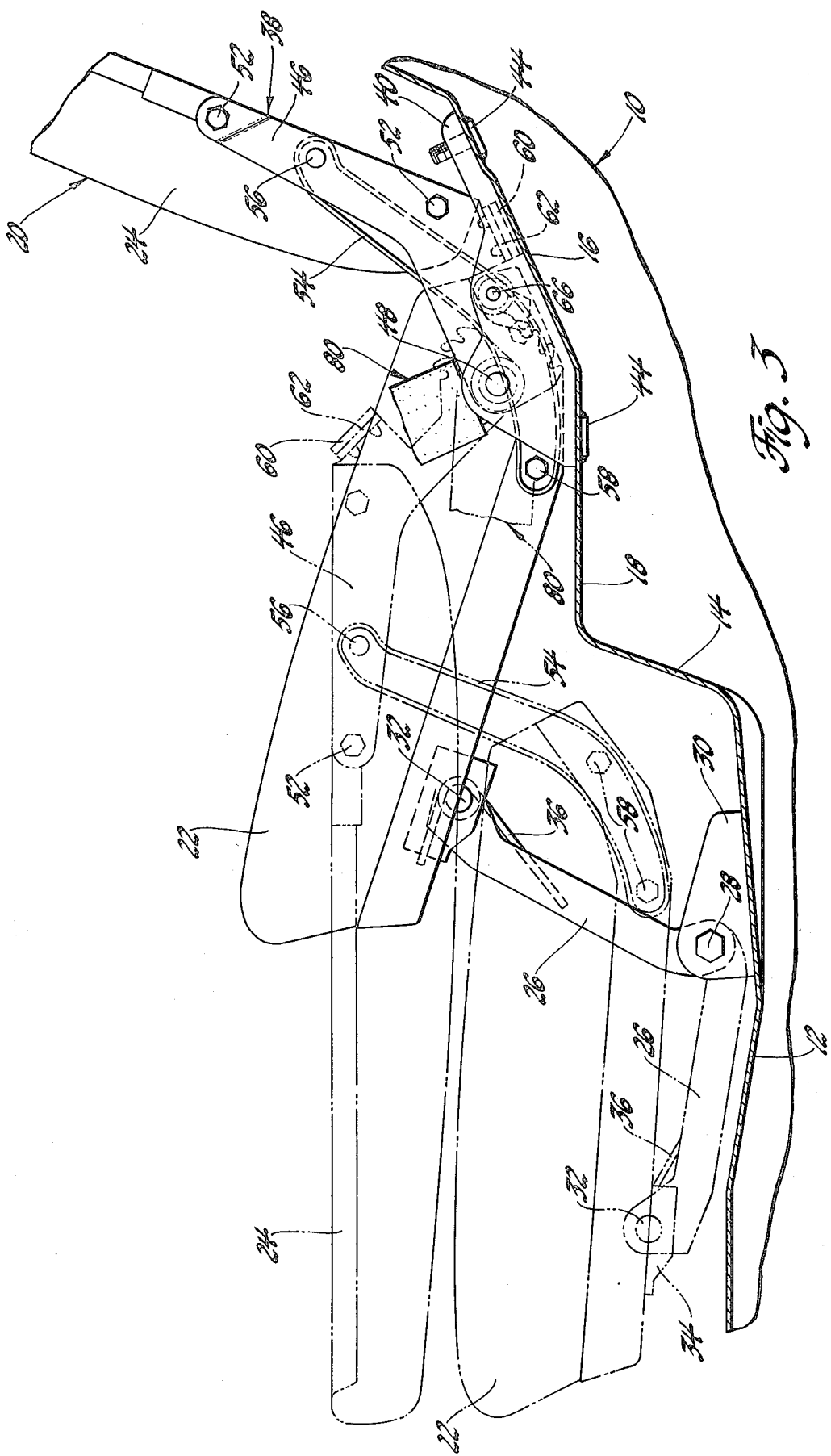
FIG. 3 is an enlarged side elevation view showing the seat cushion and seat back in full lines in normal position and in dash lines in their forwardly displaced and fully tilted positions respectively.

Referring now particularly to FIGS. 1, 2 and 3 of the drawing, a vehicle 10 of the multipurpose type includes a floor pan 12 which includes a rear kickup area having angled vertical walls 14 and 16 and an intermediate generally horizontal wall 18. The floor panel is conventional and forms no part of this invention. A vehicle rear seat 20 includes a seat cushion 22 and a seat back 24 of conventional structure. A pair of channel shaped links 26 have their lower ends pivoted at 28 to channel shaped brackets 30 and their upper ends pivoted at 32 to channel shaped brackets 34. The brackets 30 are mounted to the floor pan 12 and the brackets 34 are secured to the forward edge of the seat cushion 22 to pivotally mount the forward edge of the seat cushion to the vehicle. A coil torsion spring 36 surrounds each pivot 32 and has one end thereof engaging the base of a link 26 and the other end thereof hooked to the bracket 34. The side edges of the seat cushion 22 and the seat back 24 are mounted to the vehicle by like opposite hand seat back hinge and latch arrangements 38, one of which will now be described.

Figure 4:
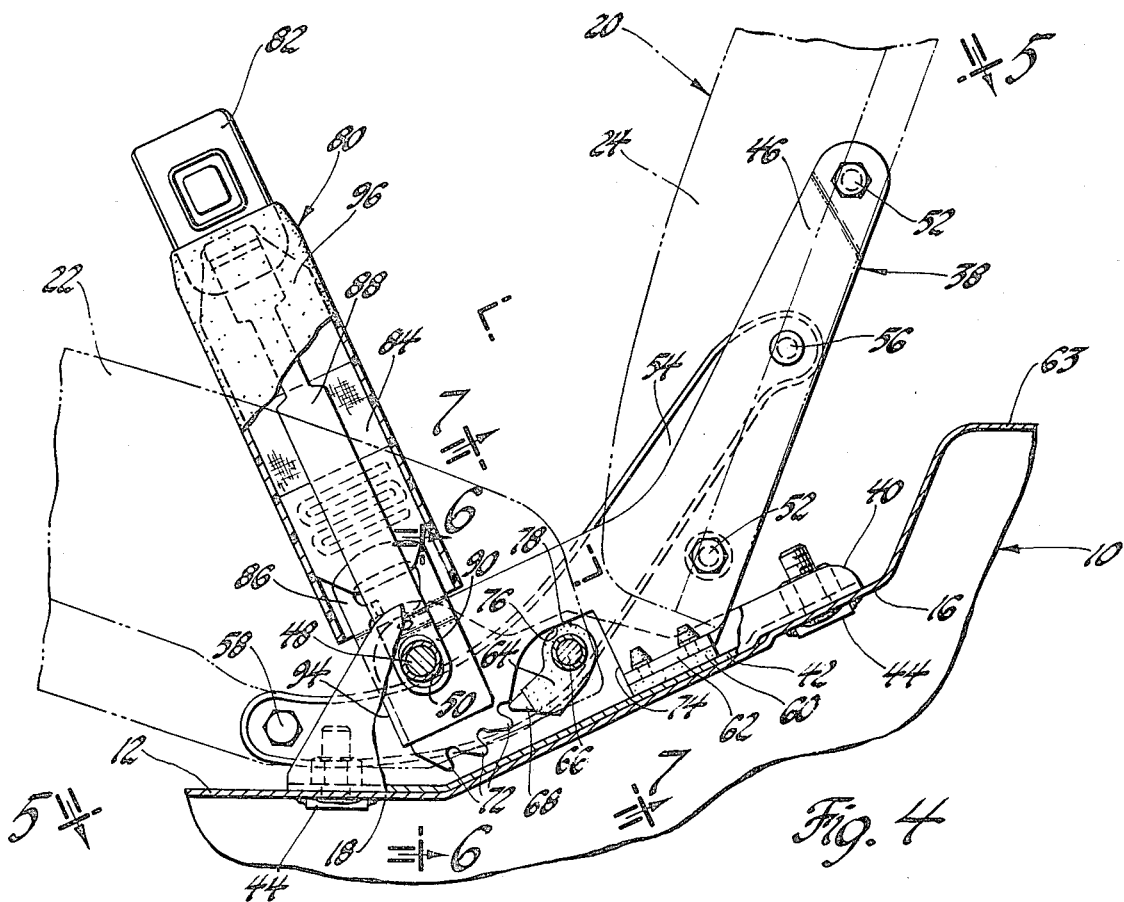
FIG. 4 is an enlarged partially broken away view of a portion of FIG. 3.
Figure 5:
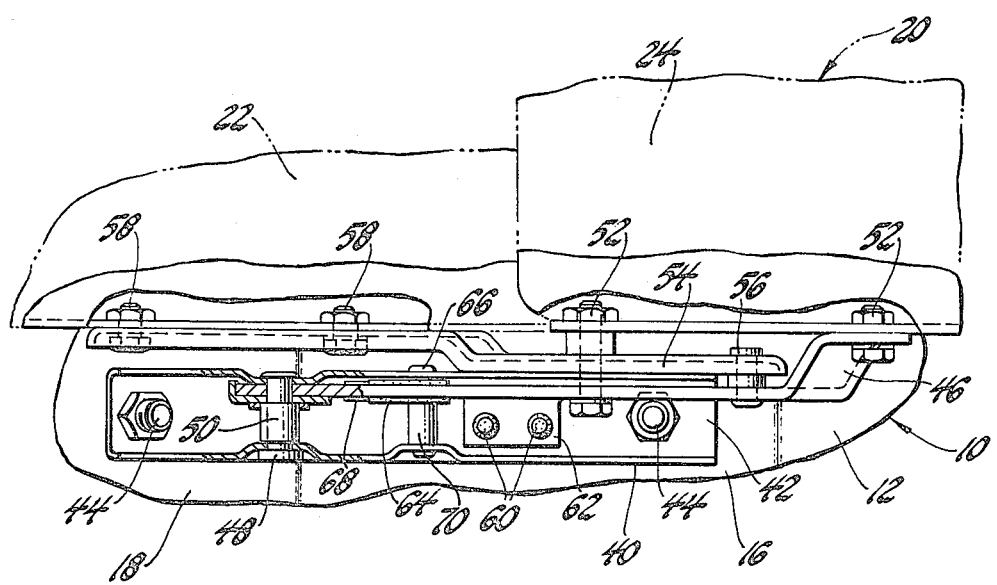
FIG. 5 is a view taken generally along line 5—5 of FIG. 4.

A channel shaped first hinge member 40 has its base wall 42, FIGS. 4 and 5, shaped to fit against walls 16 and 18 of floor pan 12 and bolted thereto at 44. A seat back support arm or second hinge member 46 is pivotally mounted at its forward or lower end on a shouldered pin 48, FIG. 6, which extends between the side walls of the hinge member 40. A bushing 50 on the pin 48 acts to hold the arm 46 in rotative engagement with the inboard side wall of the hinge member 40, as will be described. The arm 46 is bolted at 52 to the frame of seat back 24 to pivotally mount one side of the seat back on the vehicle 10. A link 54 having an outwardly flanged edge has its rear end pivoted at 56 to the support arm 46 and its forward end bolted at 58 to the sides of the seat cushion 22 to pivotally support the rearward side edge portion of the seat cushion on the vehicle. It will be understood that a like opposite hand arrangement 38 is provided on the other side of seat back 24 and seat cushion 22.

The seat back 24 and the seat cushion 22 are shown in their normal seating position in FIGS. 1, 3 and 4. In this position the arm 46 is noiselessly located relative to the hinge member 40 by a resilient plastic bumper 60, FIGS. 4 and 7, which seats on the base wall 42 of the hinge member 40 and is secured by integral shouldered extensions within openings of an integral lateral flange 62 of the arm 46. This engagement normally locates the seat back 24 in its upright or normal seating position. The seat cushion 22 is located in its normal seating position by conventional bumpers, not shown, on the rear edge thereof which engage wall 18. If it is desired to move the seat back 24 to its forwardly fully tilted position shown in FIG. 2, wherein the seat back overlies a forwardly displaced seat cushion 22, the seat back is manually moved forwardly as arms 46 pivot about pins 48 to move the links 54 forwardly and pivot the links 26 about pins 28 as the seat cushion pivots relative the links about pins 32. The neutral position of springs 36 is approximately when the links 26 are in a generally vertical position such that the springs assist initial forward displacement and resist final forward displacement of the seat cushion 22.

While the seat back 24 is normally located in its upright position shown, it is possible for the seat back to be located in any one of a number of intermediate or partially tilted positions during normal use of the vehicle due to cargo being stored in the cargo area 63 of the vehicle rearwardly of the seat back 24. The arrangement of this invention includes a latch for holding the seat back 24 in its upright position and in each of its partially tilted positions under vehicle deceleration forces.

Figure 7:
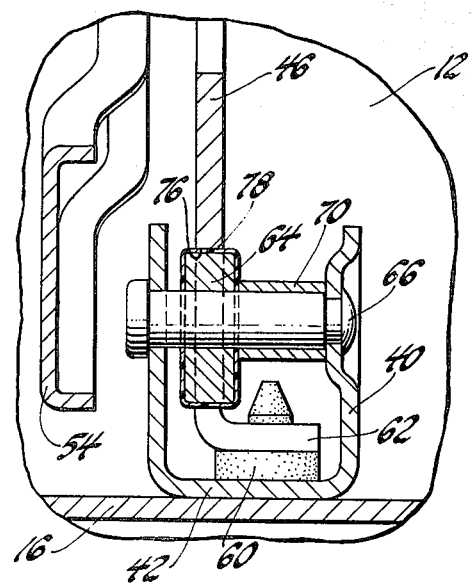
FIG. 7 is a sectional view taken generally along line 7—7 of FIG. 4.

The latch includes a pawl 64 which is pivotally mounted on a pin 66 extending between the side walls of the hinge member 40 as best shown in FIGS. 4, 5 and 7. The abutment portion of the pawl is plastic coated while the tooth 68 thereof is not. A bushing 70 surrounds the pin 66 and engages the outboard side wall of the hinge member 40 and the side wall of the abutment portion of the pawl 64 to noiselessly hold the other side wall of the pawl in engagement with the inboard side wall of the hinge member 40. The arm 46 includes a plurality of radially extending circumferentially spaced teeth 72 which extend generally toward the base wall 42 of the hinge member 40. The arm also includes a cut out 74 immediately adjacent the teeth which includes an upper edge or wall 76.

Figure 8:
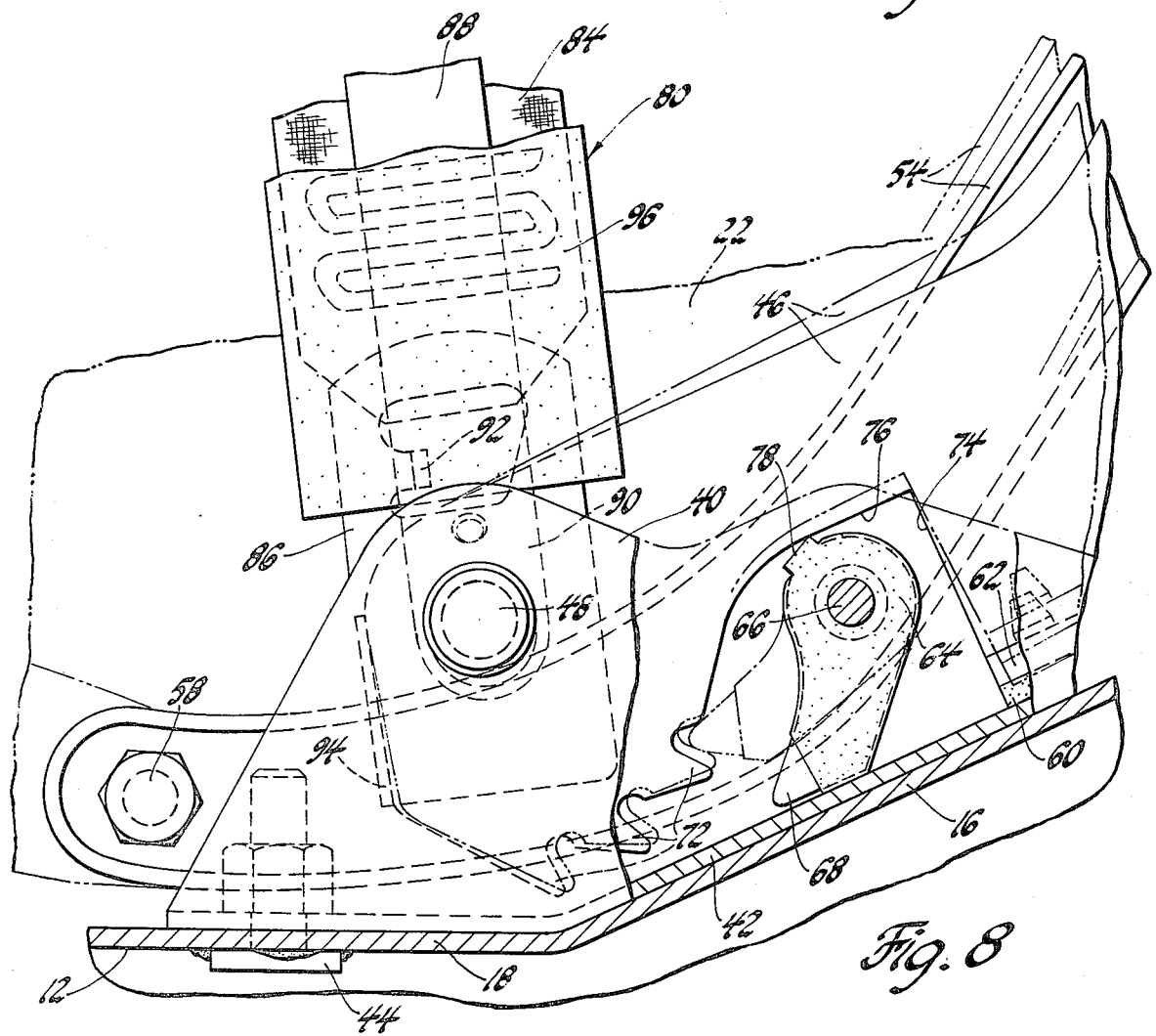
FIG. 8 is a view of a portion of FIG. 4 with the seat back in a partially tilted position.

When the seat back 24 is in the upright position as shown in FIG. 4, arm 46 straddles the pawl and wall 76 engages in integral rib 78 on the upper edge of the abutment portion of pawl 64 to rotate pawl 64 clockwise of its gravity located position of FIG. 8 and positively hold the pawl tooth 68 in engagement with arm 46 and in the rotative path of the first clockwise or one tooth 72 of the arm 46. The resiliency of rib 78 ensures engagement of tooth 68 with arm 46 and also ensures noiselessness.

When the seat back 24 is in an intermediate or partially tilted position as shown in FIG. 8, the wall 76 is disengaged from the rib 78 on the upper edge of the abutment portion of pawl 64 and the pawl is gravity biased slightly counterclockwise so that the lower edge of the abutment portion engages the base wall 42 of hinge member 40. In this position of the pawl, the pawl tooth 68 is located immediately adjacent the rotative path of the other teeth 72.

When the seat back is in the normal upright position shown in FIG. 4 and the seat back 24 is subjected to vehicle deceleration forces above a predetermined level, the inertia forces induced in the seat back will cause the seat back and arm 46 to start to rotate counterclockwise about pin 48 while momentarily holding the pawl 64 stationary. The first clockwise or one tooth 72 will thereupon instantaneously engage or pick up the tooth 68 of pawl 64 to block any further movement of the seat back 24 toward an intermediate or fully tilted position. This engagement of the one tooth 72 with tooth 68 of the pawl will also block any movement of the seat cushion 22 toward a forwardly displaced position.

When the seat back is in one of the partially tilted positions shown in FIG. 8 and both the seat back and the pawl are subjected to vehicle deceleration forces above a predetermined level, the inertia forces induced in the pawl will cause the pawl to swing clockwise into engagement with one of the other teeth 72 to thereby effectively block movement of the seat back 24 from the intermediate tilted position toward the forwardly tilted position. The seat back 24 and seat cushion 22 can be manually moved to a respective fully tilted position and forwardly displaced position at any time the deceleration forces on the vehicle are below the predetermined level.

Although three teeth 72 are shown, it is believed obvious that more teeth may be added if desired. One of the teeth will always correspond to the upright position of the seat back and the other teeth will correspond to a respective number of intermediate or partially tilted positions of the seat back.

By plastic coating the abutment portion of the pawl 64, the engagement of the pawl by the wall 76 of the support arm 46 and the engagement of the pawl with the base wall 42 will not result in any noise during normal use of the vehicle 10. Further, for manufacturing economy and as an alternate embodiment, the hinge member 40 may be made of internested L-shaped inner and outer members rather than a single member as shown. In such an instance, the base wall 42 will be of double thickness.

Figure 6:
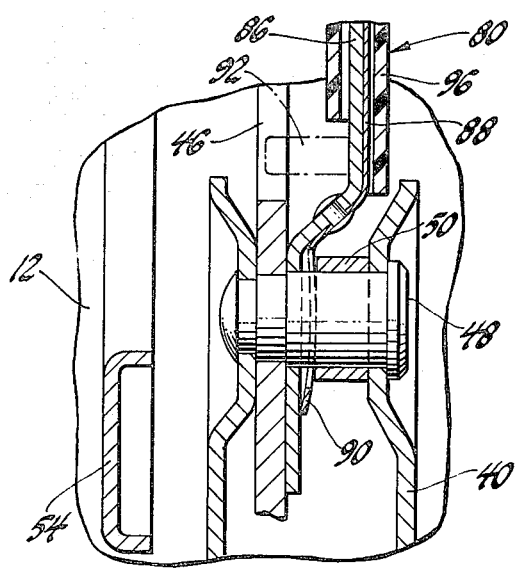
FIG. 6 is a sectional view taken generally along line 6—6 of FIG. 4.

A buckle assembly 80 is provided for a passenger occupying the seat 20. The buckle assembly 80 includes a conventional seat belt buckle 82 which is conventionally secured to the upper end of a length of seat belt webbing 84. The lower end of the webbing is conventionally secured to an anchor member 86 which is rotatably mounted on the pin 48. A spring steel stiffener 88 is secured to the buckle 82 and to the anchor member 86 and has an extension 90 which surrounds the pin 48 and is resiliently engaged by the bushing 50 to seat the anchor member 86 against arm 46 and in turn rotatably seat the arm against the inboard wall of the hinge member 40 as shown in FIG. 6.

The anchor member 86 includes a lateral tab 92 which extends inwardly therefrom and a lateral flange 94. A conventional plastic sheath 96 surrounds the webbing 84 and stiffener 88, with the tab 92 projecting inwardly of the inner wall of the sheath.

When the seat back 24 is in its normal upright position shown in FIG. 4, the forward edge of the arm 46 engages the flange 94 to position the buckle assembly 80 in an upright or use position so that a passenger sitting on the seat can insert a D ring of an inboard mounted seat belt assembly, not shown, into the buckle 82 to provide an occupant restraint belt.

When the seat back 24 is moved to the fully tilted position shown in FIGS. 2 and 3, the rotative movement of the arm 46 about the pivot 48 causes the upper edge of the arm to pick up the tab 92 and rotate the buckle assembly 80 counterclockwise about the pivot 48 so that it is located generally alongside the seat back 24 in a stored or out of the way position. When the seat back is returned to its upright position, the forward edge of the arm 46 will again pick up flange 94 to return the seat belt assembly 80 to its upright or use position.

Thus this invention provides an improved hinge and latch arrangement for vehicle seats.

The embodiments of the invention in which an exclusive property or privilege is claimed are defined as follows:

1. A seat back hinge and latch arrangement for mounting a vehicle seat including a tilting seat back to a vehicle comprising, in combination,
a pair of pivotally interconnected hinge members, one secured to the vehicle and the other secured to the seat back to mount the seat back on the vehicle for pivotal movement to a vertically inclined normal upright position, to a plurality of partially tilted positions, and to a generally horizontal fully tilted position,
means locating the other hinge member and seat back in the normal upright position,
a plurality of spaced teeth on the other hinge member arranged radially about the pivotal axis of the hinge members, one tooth corresponding to the normal upright position of the seat back and the other teeth each respectively corresponding to a partially tilted position of the seat back,
an inertia actuated pawl pivotally mounted on the one hinge member,
first means mounted on the seat back adjacent the pawl and operable under a gravity bias on the pawl to locate the pawl in a first position adjacent the rotative path of the teeth,
second means mounted on the seat back adjacent the pawl and automatically operable only in the normal upright position of the seat back to block operation of the first means and to positively hold the pawl in a second position in the path of the said one tooth for instantaneous engagement thereby upon the start of inertia actuated movement of the seat back toward a tilted position, said second means being inoperative in each of the partially tilted positions of the seat back to permit operation of said first means to locate the pawl in the first position for inertia actuated movement into engagement with one of said other teeth to lock the seat back against further tilting movement.

2. A seat back hinge and latch arrangement for mounting a vehicle seat including a tilting seat back to a vehicle comprising, in combination, a pair of pivotally interconnected hinge members, one secured to the vehicle and the other secured to the seat back to mount the seat back on the vehicle for pivotal movement to an upright position, to a plurality of partially tilted positions, and to a fully tilted position, means locating the other hinge member and seat back in the upright position, a plurality of teeth on the other hinge member arranged radially about the pivotal axis of the hinge members and spaced circumferentially of each other, one tooth corresponding to the upright position of the seat back and the other teeth each respectively corresponding to a partially tilted position of the seat back, an inertia actuated pawl pivotally mounted on the one hinge member, said pawl being gravity biased into engagement with the one hinge member to locate the pawl in a first position adjacent the rotative path of the teeth, and means on the other hinge member engageable with the pawl only in the upright position of the seat back to rotate the pawl against the gravity bias to a second position in the path of the said one tooth for instantaneous engagement thereby upon the start of inertia actuated movement of the seat back to a tilted position, said means being automatically disengaged from said pawl when said seat back is in a partially tilted position and said pawl being gravity located in said first position adjacent the rotative path of the said other teeth for inertia actuated movement into engagement with one of said other teeth to lock the seat back against further tilting movement.

3. A seat back hinge and latch arrangement for mounting a vehicle seat including a tilting seat back to a vehicle comprising, in combination, a channel shaped first hinge member having its base supported on the vehicle, a second hinge member pivoted between the side walls of the first hinge member and secured to the seat back to mount the seat back on the vehicle for pivotal movement to an upright position, to a plurality of partially tilted positions, and to a generally horizontal fully tilted position, first coacting means on the hinge members locating the seat back in the upright position, a plurality of spaced teeth on the second hinge member arranged radially about the pivotal axis of the hinge members, one tooth corresponding to the upright position of the seat back and the other teeth each respectively corresponding to a partially tilted position of the seat back, an inertia actuated pawl pivotally mounted between the side walls of the first hinge member and being gravity biased to a first position in engagement with said first hinge member, and second coating means on the second hinge member and pawl automatically engageable only in the upright position of the seat back for rotating the pawl from the first position to a second position in engagement with the second hinge member to locate the pawl in the path of the one tooth for instantaneous engagement thereby upon the start of inertia actuated movement of the seat back to a tilted position, said second coacting means being automatically disengaged when the seat back is in a partially tilted position and said pawl being gravity biased to said first position in engagement with said first hinge member to locate said pawl adjacent the rotative path of the said other teeth for inertia actuated movement of the pawl into engagement with one of said other teeth to lock the seat back against further tilting movement.

4. The combination recited in claim 3 including a plastic coating on those portions of the pawl engageable with the first and second hinge members for anti-noise purposes.

5. The combination recited in claim 3 including a passenger restraint anchor mounted on the pivot of the first and second hinge members, and coacting means on the restraint anchor and the second hinge member locating the anchor when the seat back is in the upright position.

6. A seat back hinge and latch arrangement for mounting a vehicle seat including a tilting seat back to a vehicle comprising, in combination, a channel shaped first hinge member having its base supported on the vehicle, a second hinge member pivoted between the side walls of the first hinge member and secured to the seat back to mount the seat back on the vehicle for pivotal movement to an upright position, to a plurality of partially tilted positions, and to a fully tilted position, stop means on the second hinge member engageable with the first hinge member to locate the seat back in the upright position, a plurality of circumferentially spaced teeth on the second hinge member extending generally toward the base of the first hinge member and arranged radially about the pivotal axis of the hinge members, one tooth corresponding to the upright position of the seat back and the other teeth each respectively corresponding to a partially tilted position of the seat back, an inertia actuated pawl pivotally mounted between the side walls of the first hinge member and including an abutment portion and a tooth portion, the second hinge member including a portion thereof straddling the pawl and engageable with the abutment portion thereof in the upright position of the seat back for rotating the pawl into engagement with the second hinge member adjacent the pawl in the one tooth for engagement by the one tooth upon the start of inertia actuated movement of the seat back to block further such inertia actuated movement of the seat back toward a tilted position, said second hinge member being disengaged from said pawl when the seat back is in a partially tilted position and said pawl being gravity held against a portion of the first hinge member and being located adjacent the rotative path of the said other teeth for inertia actuated movement into engagement with one of said other teeth to lock the seat back against further tilting movement.

* * * * *